(12) United States Patent
Schmitt (10) Patent No.: US 7,440,969 B2
(45) Date of Patent: Oct. 21, 2008

(54) DATA PROCESSING SYSTEMS AND METHODS FOR PROCESSING A PLURALITY OF APPLICATION PROGRAMS REQUIRING AN INPUT DATABASE TABLE HAVING A PREDEFINED SET OF ATTRIBUTES

(75) Inventor: Winfried Schmitt, Walldorf (DE)

(73) Assignee: SAP AG, Walldorf (DE)

( * ) Notice: Subject to any disclaimer, the term of this patent is extended or adjusted under 35 U.S.C. 154(b) by 419 days.

(21) Appl. No.: 11/153,401

(22) Filed: Jun. 16, 2005

(65) Prior Publication Data

US 2005/0289118 A1     Dec. 29, 2005

(30) Foreign Application Priority Data

Jun. 23, 2004   (EP)   ................................. 04014698

(51) Int. Cl.
*G06F 7/00* (2006.01)
*G06F 3/00* (2006.01)
(52) U.S. Cl. ........................................ 707/102; 715/700
(58) Field of Classification Search ................. 707/100, 707/200
See application file for complete search history.

(56) References Cited

U.S. PATENT DOCUMENTS

| | | | | |
|---|---|---|---|---|
| 5,627,979 A * | 5/1997 | Chang et al. | ................. | 715/763 |
| 5,978,788 A | 11/1999 | Castelli et al. | | |
| 6,003,036 A * | 12/1999 | Martin | ....................... | 707/102 |
| 6,418,427 B1 | 7/2002 | Egilsson et al. | | |
| 6,418,450 B2 * | 7/2002 | Daudenarde | ................. | 707/200 |
| 6,473,765 B1 * | 10/2002 | Fink | ........................... | 707/102 |
| 6,477,536 B1 | 11/2002 | Pasumansky et al. | | |
| 6,718,336 B1 * | 4/2004 | Saffer et al. | ................. | 707/102 |
| 2003/0023608 A1 * | 1/2003 | Egilsson et al. | ............. | 707/100 |

FOREIGN PATENT DOCUMENTS

WO    WO 00/19340 A1    4/2005

OTHER PUBLICATIONS

Oracle Corporation, "Materialized View Concepts and Architecture" from Oracle9i Advanced Replication, Release 2 (9.2), copyright 1996, 2002.*
"Joining Tables to Create Multitable Queries" and "Designing the PivotTable View of the Sample Query" from "Special Edition Using Microsoft Access 2002" by Roger Jennings. Published Jun. 21, 2001.*

* cited by examiner

*Primary Examiner*—Cheyne D Ly
(74) *Attorney, Agent, or Firm*—Finnegan, Henderson, Farabow, Garrett & Dunner, LLP (57) ABSTRACT

Disclosed is a data processing system, such as a data warehouse, having a number of application programs that each require a certain class of input database tables. A class is defined by means of a set of predefined attributes that needs to be present in a database table in order to be used as an input database table for a given application program. A user may enter a combination database table by combining two or more database tables. The combination database tables are classified by means of the predefined attributes and the assignment of database tables and combination database tables to classes is entered into a mapping table.

17 Claims, 7 Drawing Sheets

FIG. 1

| ENTITY TYPE I = 2 | ENTITY TYPE J = 3 |
|---|---|
| ENTITY 2.1 | ENTITY 3.2 |
| ENTITY 2.3 | ENTITY 3.4 |
| ENTITY 2.4 | ENTITY 3.1 |
| ENTITY 2.4 | ENTITY 3.2 |
| ... | ... |

DATA PROCESSING SYSTEMS AND METHODS FOR PROCESSING A PLURALITY OF APPLICATION PROGRAMS REQUIRING AN INPUT DATABASE TABLE HAVING A PREDEFINED SET OF ATTRIBUTES

FIELD OF THE INVENTION

The present invention generally relates to the field of data processing systems and related methods. More particularly, and without limitation, the invention relates to relational databases and data warehouses.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into tables. A database will typically have many tables which are stored on random access storage devices (RASD), such as magnetic or optical disk drives for semi-permanent storage.

In recent years, DBMSs have become increasingly popular for several factors, including the decrease in the cost of storage devices and the increased need to store and track electronic information. As DBMSs become increasingly popular, more and more data is stored in databases, and handling, storing, analysing, archiving, moving, and collating the data becomes more of a concern to those utilizing such data.

To manage this increasing data load various software aids, sometimes referred to as utilities, have been developed. One thing that utilities have in common is that utilities assist users in managing data. They may be simple, such as a back-up utility, which merely copies several files. They may be more complex, such as a structured query language interface, which has evolved into a standardized mechanism for manipulating data. They also may be complex and sophisticated on-line analytical processing programs (OLAP) which are designed to do complex analytical processing.

Different types of data, relational and object, may be stored in data warehouses. The term "data warehouse" is used to describe large amounts of related data that are stored together. With the increased data that is stored, there has been an increasing complexity in using, retrieving, sorting and organizing data.

On-line analytical processing (OLAP) is a key part of most data warehouse and business analysis systems. OLAP services provide for fast analysis of multi-dimensional information. For this purpose, OLAP services provide for multi-dimensional access and navigation of data in an intuitive and natural way, providing a global view of data that may be drilled down into particular data of interest. Speed and response time are important attributes of OLAP services that allow users to browse and analyze data on-line in an efficient manner. Further, OLAP services typically provide analytical tools to rank, aggregate, and calculate lead and lag indicators for the data under analysis.

An OLAP cube is a multi-dimensional representation of a set of data. Such a cube is the basis for transaction data storage in conventional data warehouse systems.

The SAP business information warehouse is a data warehouse system, which enables the analyzing of data from operative SAP applications as well as other business applications, and external data sources such as databases, on-line services, and the Internet. The SAP business information warehouse enables OLAP for processing of information from large amounts of operative and historical data. In this context, OLAP technology enables multi-dimensional analysis from various business perspectives.

The business information warehouse server for core areas and processes, pre-configured with business content, ensures that a user may look at information within the entire enterprise. In selected roles in a company, business content offers the information that employees need to carry out their tasks. As well as roles, business content contains other pre-configured objects such as cubes, queries, key figures, and characteristics for simplification of business information warehouse implementation.

With the business explorer, the SAP business information warehouse provides flexible reporting and analysis tools for analysis and decision-making support. These tools include query, reporting, and OLAP functions. An employee having access authorization may evaluate past or current data on various levels of detail and from different perspectives, not only on the web but also in Microsoft Excel.

WO OO/19340 shows a multi-dimensional data management system. Multi-dimensional data is organized into classes, which correspond to each of the dimensions that characterize the data. All relevant data is consolidated into a fact table, which is based upon information of interest. The data within this table is linked to the top level of each class that corresponds to a different dimension of data, and subclasses, which exist within a given dimension of class automatically, inherit the linked reference to the consolidated data. A user may thereby select search criteria within particular classes that correspond to dimensions of interest. This search criteria is then used to form a query which is applied to a relational database to obtain the desired results.

U.S. Pat. No. 5,978,788 shows a system and method for generating multi-representations of a data cube. The data cube is split into a plurality of dimensions. Representations are selected and the data cube is reconstructed.

U.S. Pat. No. 6,418,427 shows a method for modifying dimension structures and relations in multi-dimensional processing.

U.S. 2003/0023608A1 shows a method for transforming a set of relations into multi-dimensional data cubes by means of a synthesis process.

It is a common disadvantage of conventional data processing systems that the assignment of data tables to be processed by application programs and the selection of the output format of the data processing is a tedious and error prone task which often involves a substantial amount of manual interaction. There is, therefore, a need for data processing systems and methods that reduces the amount of user interaction.

SUMMARY OF THE INVENTION

In accordance with embodiments of the present invention, there is provided a data processing system comprising a plurality of application programs. Each application program requires at least one input database table in order to perform a data processing operation on the input data. The input database table includes one or more predefined set of attributes in order to be acceptable to a given application program.

Each predefined set of attributes defines a class of database tables corresponding to a certain rule of an application program. In other words, each application program of the data processing system is designed such that it requires a tabular data input that includes a certain set of attributes. The database tables are stored in a relational database. Preferably, the same attribute names are used by the application programs and in the database tables. This naming convention provides an interface between the database tables and the application programs.

The assignment of sub-sets of the database tables to the classes is stored in a mapping table. In order to perform a data processing operation on a sub-set of the database tables that comply with a given class, the user only needs to select one of the application programs. The input database tables to be processed by the selected application program are determined by reading the database tables assigned to the class required by the application program from the mapping table and reading the sub-set of the database tables identified in the mapping table from the relational database.

The set of database tables stored in the relational database includes at least one combination database table that is obtained by combining entries of at least first and second database tables. The data processing system enables a user to enter a combination of at least first and second database tables of the set of database tables stored in the relational database. The combination of the first and second database tables is stored in a combination database table for access by an application program that requires a corresponding class of database table as input data.

In accordance with an embodiment of the present invention, a data processing method is provided for enabling the processing of database tables of a data warehouse by means of an application program. For example, each database table of a relational database of the data warehouse has a number of data entries, which are referred to as 'entities'. The entities of a given database table have the same entity type, i.e., 'account number', 'financial statement item', 'organizational unit', 'partner organization', 'version', 'time', etc.

For example, there are database tables of the entity type 'accounts', which contain the account numbers of customers and vendors. Database tables of entity type 'organizational unit' may contain the legal entities of a company or the organizational units of the company from a business structure perspective.

A plurality of application programs for processing of classes of the database tables is provided. A class of database tables contains database tables having a common entity type. This classification enables to perform the same data processing steps by the application program for different database tables provided that the database tables are within the same class.

For a given application program, a sub-set of the database tables is assigned to the classes for access by the application program to the entities stored in the sub-set of these database tables. The assignment of database table to classes may be stored in a mapping table.

In accordance with another embodiment of the present invention, an OLAP component is provided. A user may select from a set of predefined OLAP cubes. The user may classify a selected OLAP cube in order to assign the selected OLAP cube to predefined OLAP cube classes. For example, there are OLAP cube classes for performing different kinds of transactional data processing, such as "investment", "equity", or "goodwill" transactional data processing.

In accordance with a further embodiment of the present invention, a user may select an application program from a set of application programs. Each one of the application programs of the set of application programs requires database tables of one or more entity type classes and/or one or more OLAP cubes of specific OLAP cube classes. Both the entity type classes and the OLAP cube classes supported by the set of application programs are predefined.

When a user selects a database table as input data for the selected application, the user may enter the name of a database table in a mapping table in order to assign the database table to one of the predefined entity type classes supported by the selected application. In one embodiment, at least one database table needs to be selected and mapped by the user for each entity type class required as input data by the selected application.

The same may apply analogously as far as the OLAP cube classes are concerned. Specifically, when the user selects one of the OLAP cubes, the selected OLAP cube needs to be mapped to one of the predefined OLAP cube classes. This is done by entering the name of the given OLAP cube into a mapping table.

In accordance with a further embodiment of the invention, the mapping of database tables to entity type classes is a n:1 mapping, i.e. between one and n database tables may be mapped to the same entity type class where "n" is any integer. Database tables which are mapped to the same entity type class are merged for processing by the selected application. In contrast, the mapping of OLAP cubes to OLAP cube classes is a 1:1 mapping.

In accordance with a further embodiment of the invention, the OLAP cubes are loaded from internal or external data sources. Alternatively, the OLAP cubes are computer generated or user defined.

One advantage of embodiments of the present invention is that the amount of user interaction is substantially reduced. The user needs to assign data tables stored in the data warehouse to the pre-defined classes of data tables required by the various application programs by entering the respective assignments of data tables to data table types into the first mapping table. Also, the user needs to enter the assignment of OLAP cubes to the pre-defined OLAP cube classes required by the various application programs into a second mapping table.

After the mapping tables have been entered, the following data processing may be performed fully automatically without requiring further user interaction. For example, if one of the application programs is invoked the data tables to be processed by that application program are accessed using the first mapping table and the result of the data processing is stored in the OLAP cube as determined by the second mapping table. This increases the user friendliness of the data processing system and makes the data processing more reliable as errors due to manual selection of database tables as input data may be avoided.

In accordance with a further embodiment of the invention, a user may select the database tables from the set of database tables stored in the data warehouse for specifying a combination database table. This selection may be restricted by the allowable combinations of data types which may be entered into an application program as input data. Pairs of entries of the database tables which the user has combined are stored in the combination database table.

In accordance with a further embodiment of the invention, a matrix is displayed for determining the entries to be combined. The matrix has a column direction for displaying the entries of one of the selected database tables and a row direction for displaying of the entries of the other one of the selected database tables. For each matrix element a check-box is displayed. By clicking on a check-box, the user may combine the corresponding column and row entries.

In accordance with a further embodiment of the invention, the entries of the selected database tables are displayed in separate lists which are distanced by a connector field. A combination of list entries is entered by connecting the entries to be combined by a graphical connector symbol.

In accordance with a further embodiment of the invention, the connectors which have been entered for a given entry in one of the lists are visualized in response to a user's selection of the entry.

In accordance with a further embodiment of the invention, a user may enter rules for the combination of entries in different database tables. For example, these rules may reflect a business structure of the enterprise as far as the assignment of companies and legal entities of the company to profit centers or business units is concerned.

In accordance with a further embodiment of the invention, the user selects a number n of database tables from the data warehouse to be combined. In order to enter the combination, the user specifies m-tuples of entries, where each one of the m-tuples contains one entry from each one of the selected database tables. The m-tuples which are created this way are stored in the combination database table.

For example, a mapping table is stored in the data processing system for each application program that specifies which ones of the database tables or classes of database tables may be combined for the purpose of processing the resultant combination database table by the respective application program. A user may only select database tables for combination for the purpose of processing by a selected application program if the mapping table of the selected application program allows combination of the user selected tables. After a user's selection of an allowable database table combination, the user selects one item from each database table of the selected table combination in order to specify an entry into the combination database table that combines entries from the selected database tables. Preferably, the user selects at least two database tables for combination.

In accordance with a further embodiment of the invention, the user selects one of the application programs of the data processing system by means of the user interface. In response, the user interface reads the respective table that is assigned to the selected one of the application programs in order to determine the allowed table combinations.

Next, the user enters a combination of two or more database tables. If the selected combination is permitted, the user interface displays a selection screen for a user's selection of data items from the selected tables in order to specify entries into a resultant combination table. After selection of entries of the database tables for specification of respective entries into the combination database table, a program module is invoked by the user interface that generates the combination database table as specified by the user and stores the combination database table in the data processing system. Next, the selected application program may be invoked that performs a read access in order to read the combination database table for the purpose of data processing.

Embodiments of the present invention are advantageous in that they can provide an efficient, user friendly and ergonomic means for specifying input data for an application program on the basis of database tables that are already stored in a data warehouse. By specifying allowed combinations of database tables for a given application program in respective mapping tables entries, un-allowed combinations are avoided that would otherwise lead to errors in the data processing performed by the user selected application program.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

In the following, exemplary embodiments of the invention will be described in greater detail by making reference to the drawings in which.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
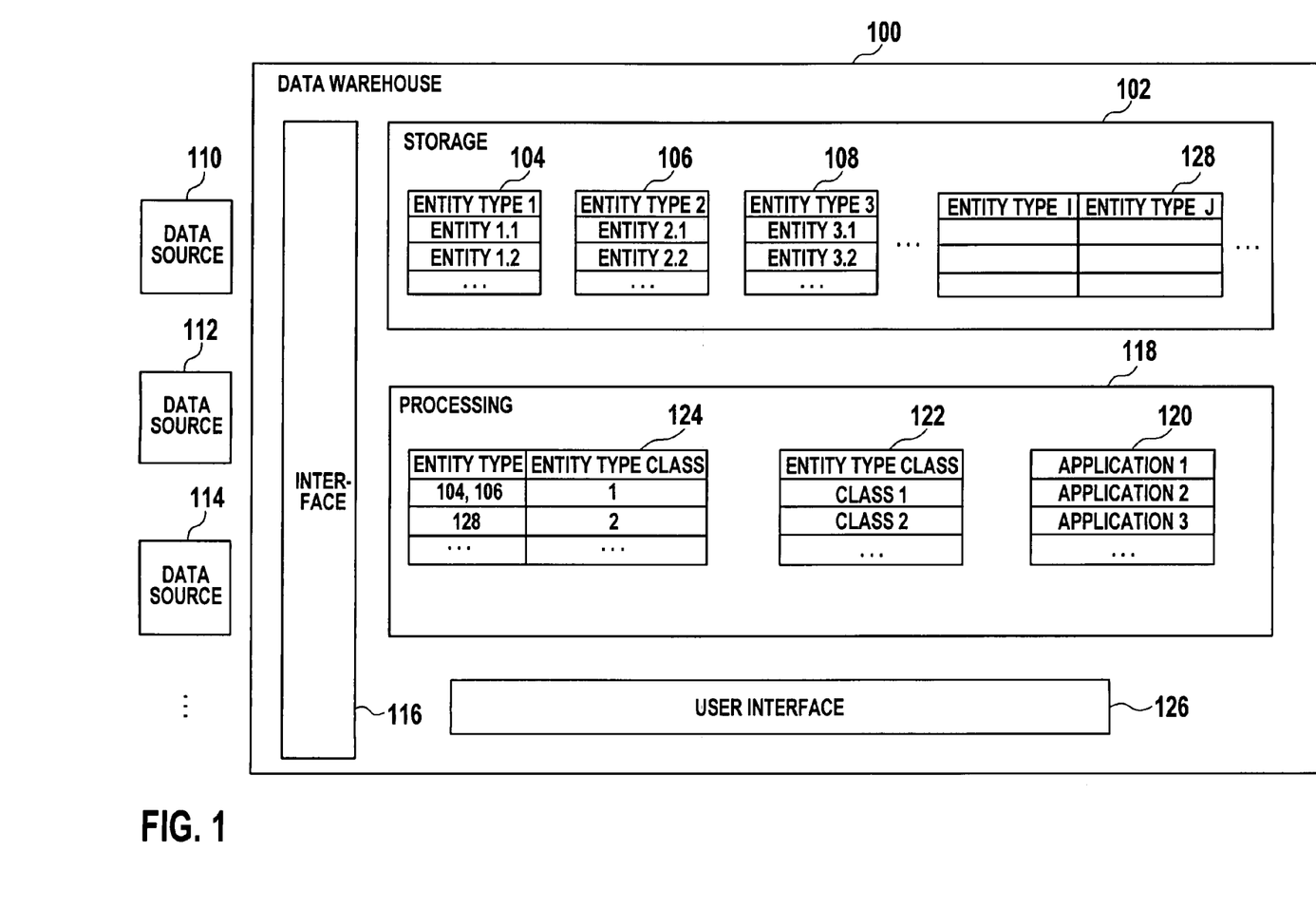
FIG. 1 is a block diagram of an embodiment of a data processing system consistent with the invention.

FIG. 1 shows data warehouse computer system 100. Data warehouse computer system 100 includes storage 102 for storing a number of database tables 104, 106, 108, . . . n. Wherein " . . . n" represents a continuing sequence of elements with "n" signifying the last element in the sequence.

Data from internal or external data sources 110, 112, 114, . . . n is extracted, transformed and loaded into data warehouse computer system 100 via interface 116. The imported data is stored in the database tables 104, 106, 108, . . . n, where each database table stores data of the same entity type. A data item of a certain entity type which is stored in one of the database tables 104, 106, 108, . . . n is referred to as 'entity' in the following description.

In the example considered here, database table 104 stores entities of entity type 1. For example, entity type 1 is 'account numbers of customers'. In this instance, entity 1.1 is the account number of customer A, entity 1.2 is the account number of customer B, etc.

Database table 106 stores data entities which have entity type 2. For example, entity type 2 is 'account numbers of vendors'. In this instance, entity 2.1 is the account number of vendor A, entity 2.2 is the account number of vendor B.

For instance, database table 108 has entity type 3 'legal entity' and stores the legal entities of a company. In this instance, entity 3.1 is 'xy GmbH', entity 3.2 is 'xy Ltd', etc. Each database table has a number of attribute data fields that are not shown in the drawing.

Processing component 118 of data warehouse computer system 100 has a set of application programs, 'application 1', 'application 2', 'application 3', . . . 'application n'. Each application program of the set of application programs 120 has the purpose of performing a certain type of business orientated data processing, such as for the purposes of accounting, book keeping and/or consolidation.

Each one of the application programs of the set of application programs 120 is designed to process certain classes of database tables. For example, application 1 is designed to process database tables containing account numbers and organizational entities, whereas other application programs of the set of application programs 120 are designed for the processing of other classes of database tables.

A definition of the classes of entity types of database tables supported by the set of application programs 120 is stored in list 122. Each of the application programs 120 requires a specific input format, i.e., one or more input database tables that include a specific set of attributes. The attribute data values contained in an input database table are processed by the selected application program. Preferably, the attribute names in the database tables and the attribute names used by the application program are identical. This naming convention provides an interface between the database tables stored in the relational database and the application programs.

Mapping table 124 serves to assign one or more of the database tables 104, 106, 108, . . . n to classes. These assignments may be entered by a user via user interface 126.

In operation, data is loaded into data warehouse computer system 100 from one or more of the data sources 110, 112, 114, . . . n via user interface 116 in order to store data entities of various entity types in corresponding ones of database tables 104, 106, 108, . . . n.

A user may select one of the application programs of the set of application programs 120 via user interface 126. The selected one of the application programs of the set of application programs 120 requires certain classes of database tables as input data.

For example, a user selects 'application 1' of the set of application programs 120 which requires database tables of entity type class 1 and entity type class 2 as input data. In order to enable access of the selected application program 'application 1' to the required database tables, the user enters the names of one or more of the database tables 104, 106, 108, . . . n in mapping table 124 for each required class.

For example, entity type 1 and entity type 2 of database tables 104 and 106 may be classified in 'class 1'. In this instance, the user enters the name of database table 104 and/or the name of database table 106 in the left column of mapping table 124 for assignment to class 1.

It is important to note that the assignment of database tables to classes is a n:1 relationship, i.e., the user may assign one of the database tables 104, 106, 108, . . . n, which is classified as 'class 1' by means of mapping table 124 or he or she may also assign two or more of the database tables falling in class 1 by means of mapping table 124. In the latter case, the database tables being assigned to the same class are merged for processing by the selected application program, i.e., 'application 1'.

Entering of the mapping of database tables to classes may be facilitated by pull down or pop up menus listing the names of the database tables 104, 106, 108, n, which may be selected by the user for assignment to a certain class.

After the entry of mapping table 124 application 1 may start data processing by accessing of the class 1 and class 2 data tables as specified in mapping table 124.

Storage 102 is also used for storage of combination database tables 128. Although only one database 128 is depicted it should be noted that multiple databases 128 might be included. Combination database table 128 has a left column for storing of entities of entity type i and a right column for storing of entities of entity type j.

At least one of the application programs 120 is designed to process certain classes of combination database tables and/or database tables. For example, application 2 is designed to process database tables containing account numbers and combination database tables combining legal entities and profit centers.

By means of user interface 126, a user may select first and second database tables of storage 102 as a basis to create combination database table 128. For example, the user may select database table 106 having entity type i=2 and database table 108 having entity type j=3. Now the user may enter combinations of the entities stored in the database tables 106 and 108. In order to create pairs of entities having entity types i=2 and j=3, the user selects one of the entities of entity type 2 of database table 106 and assigns this entity to one of the entities of entity type j=3 of database table 108. This pair of entities is entered in combination database table 120 whereby the entity having entity type i=2 is entered in the left column and the other entity having the entity type j=3 is entered in the same row in the right column. This procedure is performed for all entities of the database tables 106 and 108 which need to be combined.

The additional entity type that results from the combination of the entity types i and j is also entered into mapping table 124 in order to assign an entity type class to the combination entity type.

In the example considered here, application 2 requires input data tables of the entity type class 2 that has a certain predefined set of attributes. When the user selects the application 2 by invoking the application 2 through the user interface 126, the application 2 reads the entity type that is assigned to the entity type of class 2 from the mapping table 124 for processing of the data values stored in that entity type i.e. database table 128 in the example considered here. This has the advantage that also in case combination database tables need to be processed, the user still only needs to select the respective application in order to initiate the data processing without having to perform complex manual input operations for selection of the data to be processed by the application. Using the predefined classes and attributes the application may automatically select and access the database tables it requires as input data for the data processing to be performed.

Figure 2:
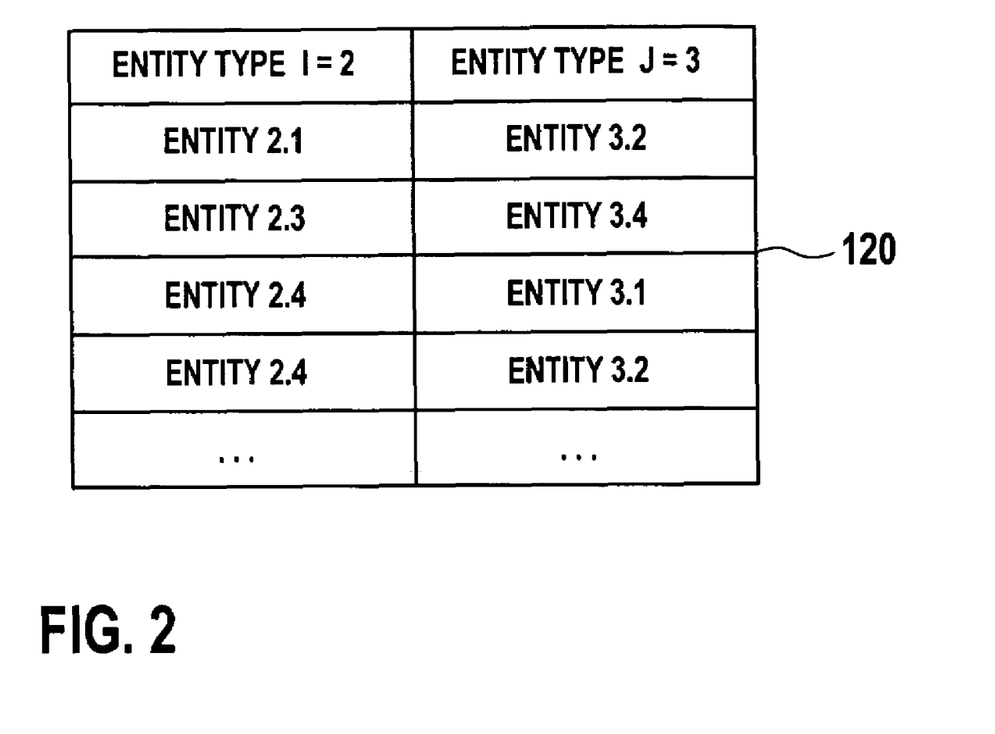
FIG. 2 is shows an example of a user defined combination database table.

FIG. 2 shows an example for the user entries into the combination database table 128.

Figure 3:
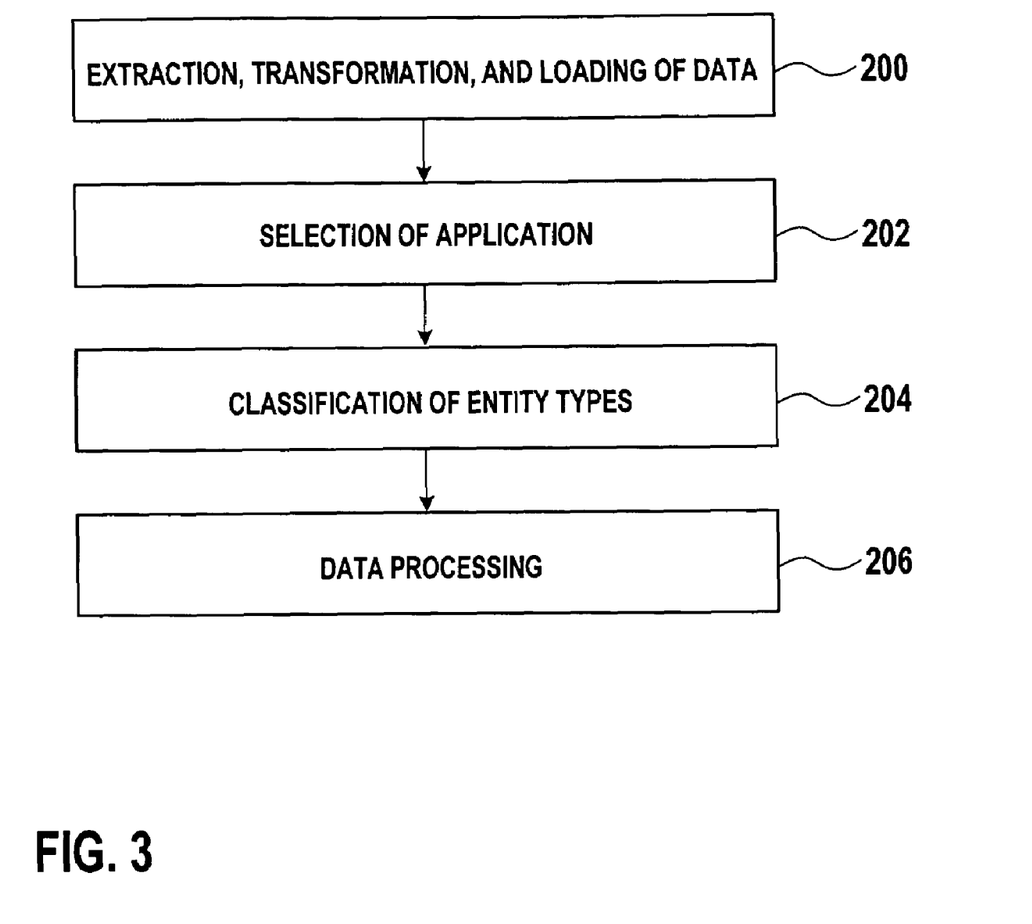
FIG. 3 is illustrative of a flow diagram of an embodiment of a method of the invention.

FIG. 3 shows an example of a corresponding flowchart. In step 200 data is extracted, transformed and loaded from internal or external data sources. In step 202 a user selects an application program from a set of application programs being implemented in the data warehouse computer system. The selected application program requires certain classes of database tables as input data.

Access to the input data is enabled by classification of database tables having certain entity types and selection of one or more of the classified database tables as input data for the selected application program. This is done in step 204. In step 206 data processing is performed by the selected application program on the basis of the input data as specified in the classification and selection step 204.

It is to be noted that prior to selection of an application in step 202, a user may enter one or more combination database tables on the basis of the data that is loaded from external sources in step 200. The classification of the resultant combination database tables is performed on the basis of predefined sets of attributes as it is the case for the other database tables. For example, if one of the application programs requires an input data table that has a certain set of attributes, this set of attributes constitutes a class definition. Any database table or combination database table that comprises this set of attributes may be assigned to that class in the mapping table (cf. mapping table 124 of FIG. 1).

It is to be noted that a combination database table may combine more than two database tables. For example, a user selects a number of n database tables that have been obtained by loading from the external sources. Next, the user specifies a number of n-tuples of entities for storage in the combination database table. The resulting combination database table is stored in the relational database for access by a respective application program and its classification is entered into the mapping table.

Figure 4:
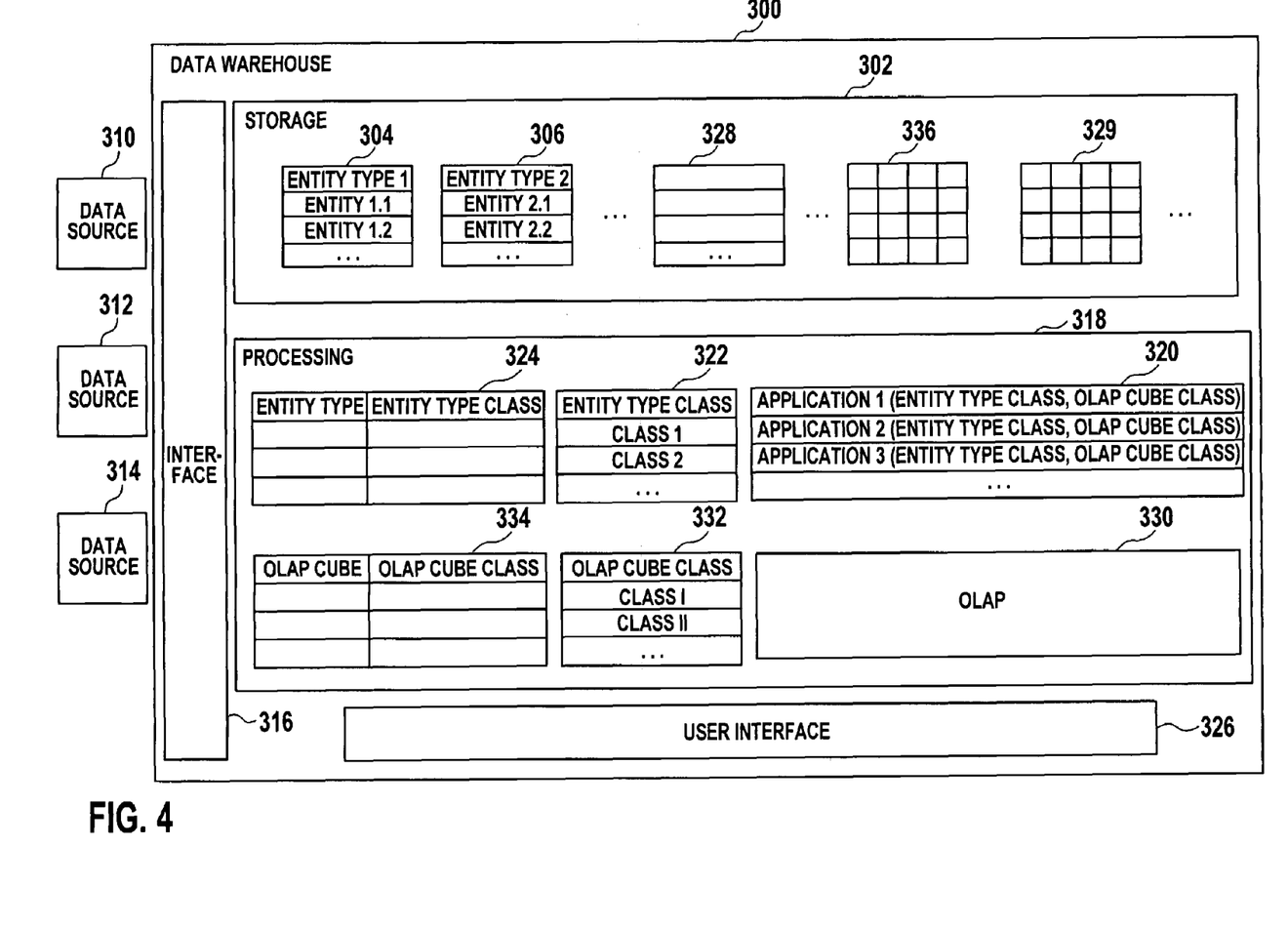
FIG. 4 is a block diagram of an alternative embodiment of a data processing system consistent with the invention.

FIG. 4 shows an alternative embodiment. Elements in the embodiment of FIG. 4 which correspond to elements of the embodiment of FIG. 1 are designated by like reference numerals having added 200.

In addition to the embodiment of FIG. 1, the data warehouse computer system 300 of FIG. 4 contains a set of OLAP cubes, i.e., OLAP cube 336, OLAP cube 329, . . . . The OLAP cubes 336, 329, . . . n are loaded from data sources 310, 312 or 314. Alternatively, the OLAP cubes 336, 329, . . . n are generated by data warehouse computer system 300 or user defined. Further, data warehouse computer system 300 has OLAP component 330.

Initially, the OLAP cubes 336, 329, . . . n are empty and specify the layout for transaction data storage for various purposes. For example, OLAP cube 336 specifies a transaction data storage of type "investment", whereas OLAP cube 329 specifies a transaction data storage of type "equity".

The set 320 of application programs has application programs "application 1", "application 2", "application 3", . . . n. Each one of the application programs is designed for processing of database tables of specific ones of the entity type classes given in list 322. Likewise, each one of the application programs of the set of application programs 320 is designed for performing of database processing steps on data contained in an OLAP cube of a certain class.

The classes of OLAP cubes which are supported by the application programs 320 are stored in list 332. List 332 contains a description of each one of the OLAP cube classes, i.e., class I, class II, . . . n. For example, class I contains OLAP cubes which are used for financial transactional data storage and processing whereas OLAP cube class II contains OLAP cubes which are used for real estate type transactional data storage and processing.

Mapping table 334 serves to map user selected ones of the OLAP cubes 336, 329, to OLAP cube classes I, II, . . . n.

In operation, the user selects one of the application programs of the set of application programs 320 via user interface 326. The selected one of the application programs 320 requires database tables of certain entity type classes and at least one OLAP cube of a certain OLAP cube class. Via user interface 326 the user is prompted to specify the mapping of database tables to the required entity type classes and the mapping of OLAP cubes to the required OLAP cube class.

For example, the user has selected "application 1" from the set of application programs 320. Application 1 requires database tables of entity type class 1 and 2 and OLAP cube class I.

Next, the user selects database tables from storage 302 for assignment to the required entity type classes 1 or 2. This may be facilitated by pull down menus containing a list of the names of the available database tables 304, 306, 308, . . . n.

Likewise, the user is prompted to select one of the OLAP cubes 336, 329, . . . n for classification and mapping to the required class 1. This mapping is entered in mapping table 334 which relates the user selected OLAP cube of the OLAP cubes 336, 329, . . . n, to the required OLAP cube class, which is class I in the example considered here.

When the selected one of the application program 320 is started the input data is accessed in storage 302 by means of mapping table 324. Further, the selected one of the application programs 320 invokes OLAP component 330 to generate transaction data for the OLAP cube as specified by the user in mapping table 334.

For example, if the user has selected OLAP cube 336 and classified this OLAP cube 336 as class I, this mapping is retrieved by the selected one of the application programs, i.e. application 1 from mapping table 334. By means of OLAP component 330 transaction data is stored in the OLAP cube 336 on the basis of the input data. In addition, the selected one of the application programs performs certain data processing steps on the transactional data stored in the selected one of the OLAP cubes. Hence, the result of the data processing of the selected one of the applications is outputted and stored in the transaction data storage provided by the selected one of the OLAP cubes within storage 302.

This has the advantage that the selection of database tables as input parameters and the selection of OLAP cubes is simplified and is made more user friendly. Further, this enables non-expert users to perform complex transactional data processing as embodiments of the invention enables to integrate expert knowledge in the class definitions.

Figure 5:
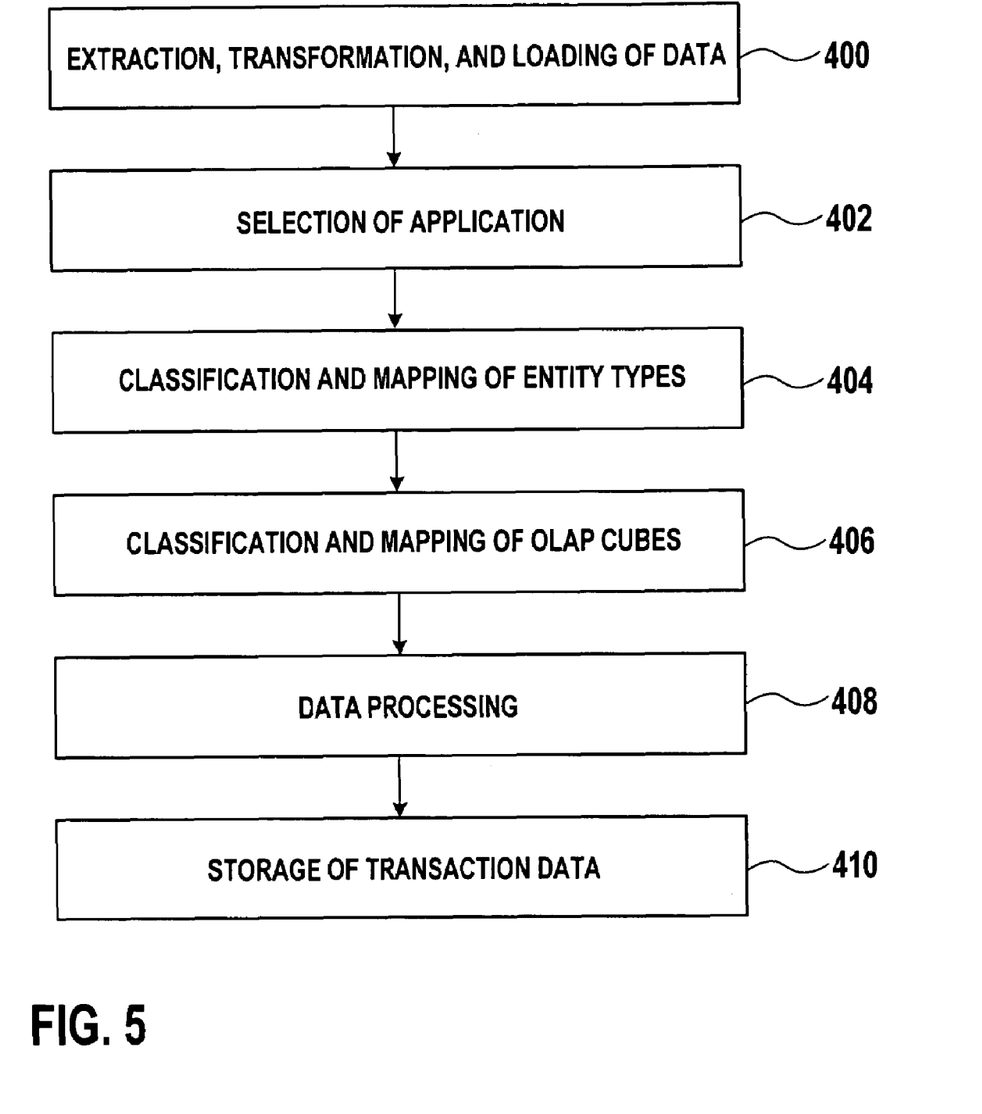
FIG. 5 is illustrative of an alternative embodiment of a method consistent with the invention.

FIG. 5 shows an example of a corresponding flowchart. In step 400 data is extracted, transformed and loaded from internal and/or external data sources. In step 402, a user selects one of the application programs supported by data warehouse computer system. The selected one of the application programs requires certain classes of database tables and at least a certain class of OLAP cube as input data and input parameters, respectively. In step 404, database tables and combination database tables having certain entity types, i.e., certain sets of attributes, are assigned to the required classes by a user. This assignment of database tables to required classes is stored as a mapping table.

In step 406, an OLAP cube is selected by a user and classified in the required OLAP cube class. The corresponding mapping is stored as a further mapping table.

Now the selected one of the application programs may start data processing. In step 408 the selected application program invokes an OLAP component in order to fill the selected OLAP cube with transactional data. This is performed on the basis of the input data provided by the selected database tables. The transactional data contained in the OLAP cube is further processed by the selected one of the application programs. The result of the data processing operation is stored as transactional data in the OLAP cube. In step 410, the transactional data is visualized on the user interface and stored for later reference.

Figure 6:
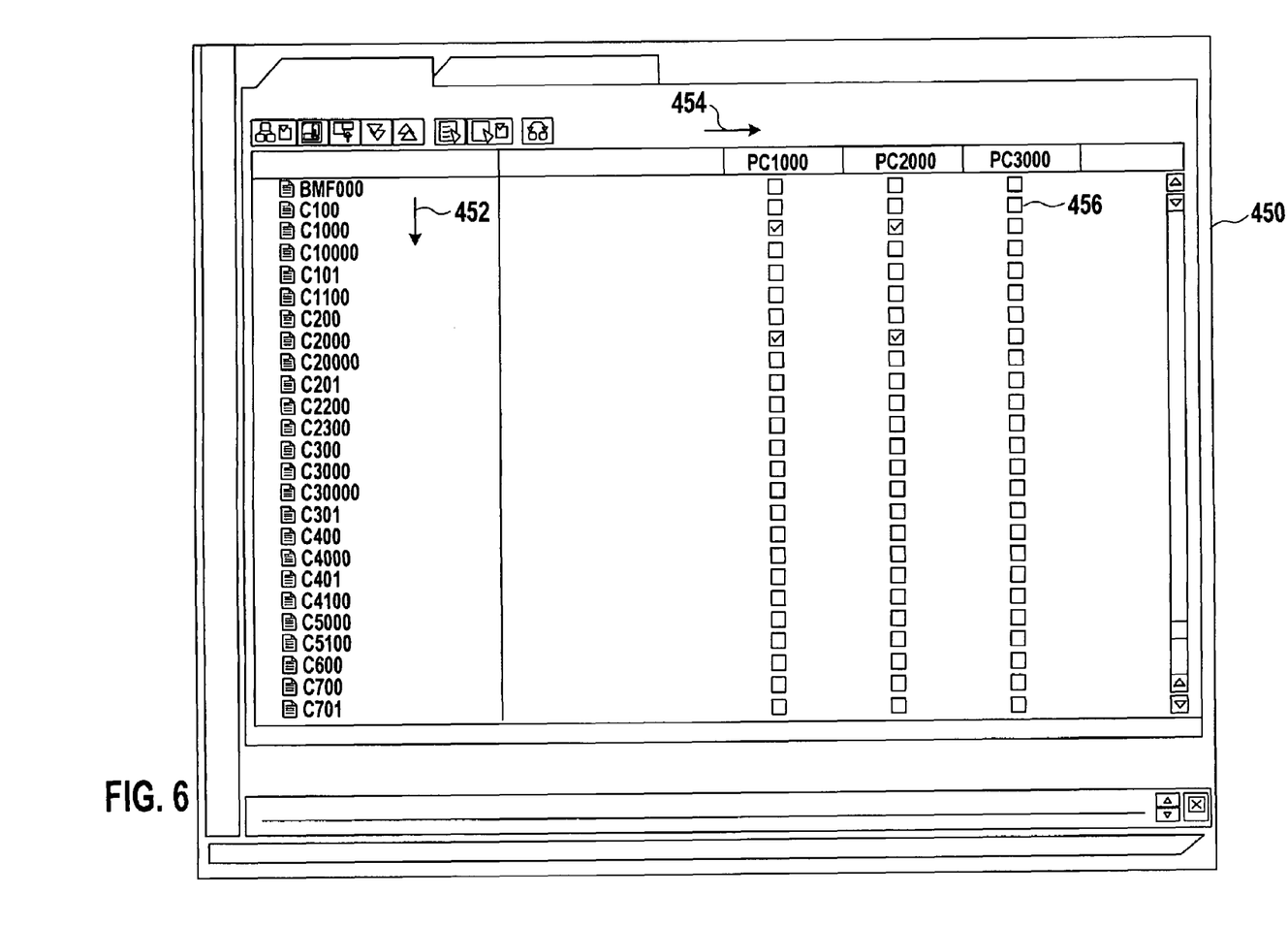
FIG. 6 is shows a first embodiment of a user interface for entering combinations of database table entries.

FIG. 6 illustrates an embodiment of user interface 126 (cf. FIG. 1). By means of user interface 126, a dialogue box 450 is created. Previously, the user has selected a database table storing legal entities and a database table storing profit centers. The legal entities are displayed in column direction 452 of dialogue box 450 i.e., legal entities BMF00, C100, C1000, C10000, C101, etc.

The profit centers of the other one of the user selected database tables are displayed in row direction 454 within dialogue box 450. This way a matrix is defined, where each matrix element has a coordinate within dialogue box 450 that is determined by a pair of legal entities and profit centres. On each matrix element a check-box 456 is displayed.

In the example considered here, the user has checked the check-boxes at matrix elements C1000, PC1000; C1000, PC2000; C2000, PC1000; and C2000, PC2000. This way the user has specified corresponding combinations of entities of the database tables which are stored in the combination database table.

Figure 7:
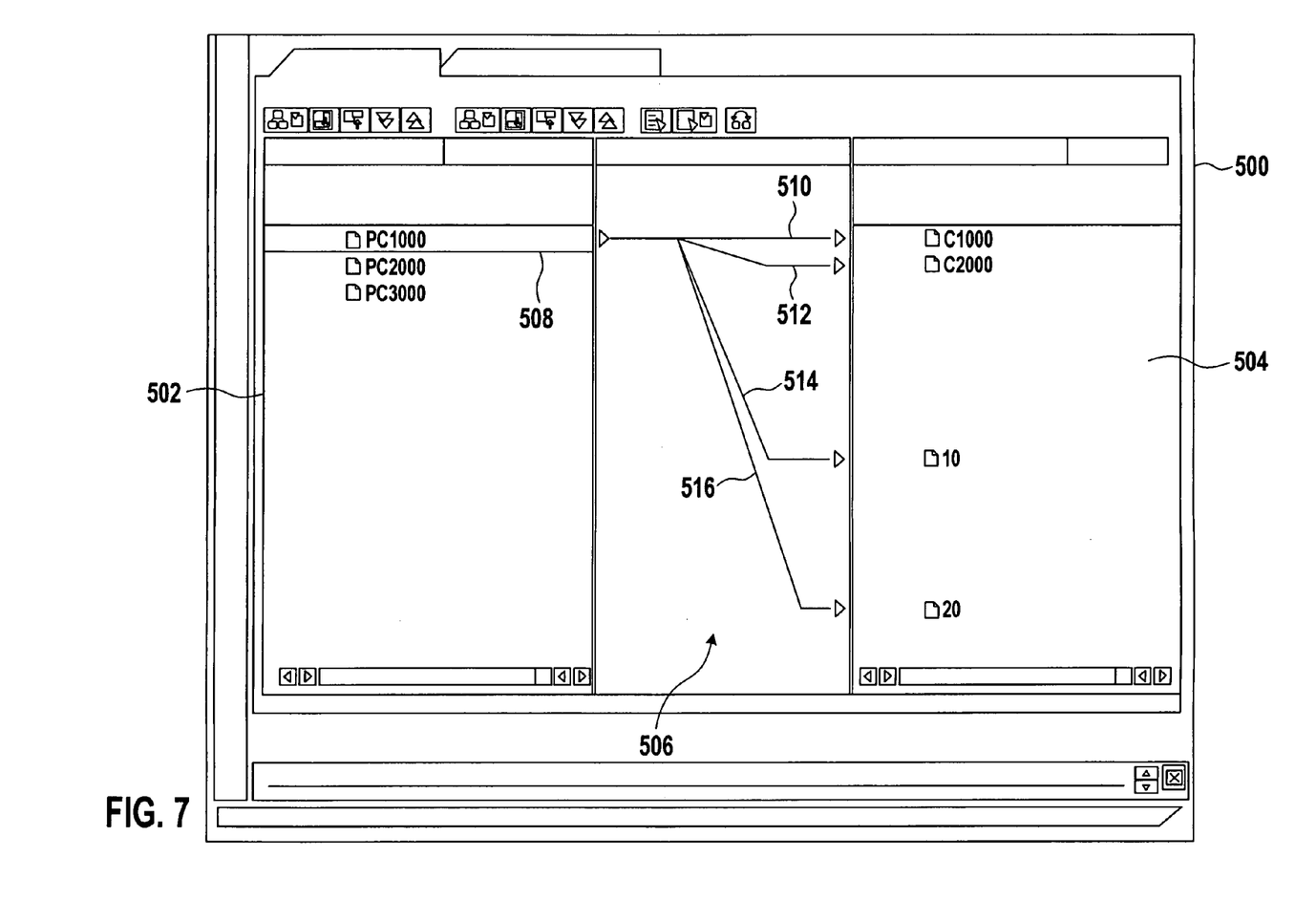
FIG. 7 is a second embodiment for a user interface for entering of combinations of database table entries.

FIG. 7 shows an alternative embodiment of user interface 126 (cf. FIG. 1). Dialogue box 500 shows list 502 of entities of one of the selected database tables, i.e. the database table storing the profit centres. Further dialogue box 500 has list 504 showing the entities of the other one of the selected database tables, i.e. the legal entities of the company.

The lists 502 and 504 are separated by connector field 506. In connector field 506 a user may enter connectors from an entity of list 502 to entities of list 504 and from entities of list 504 to entities of list 502. When a user moves selection bar 508 onto one of the entities of list 502 or list 504 the connectors originating from the selected entity are shown in connector field 506.

For example, the user has moved the selection bar 508 onto profit center entity 'PC1000' in list 502 in the example shown in the FIG. 5. In response, connectors 510, 512 and 514 are shown in connector field 506.

In addition, the user may enter an additional combination between PC1000 and legal entity 20 by entering connector 516. This may be done by drawing a corresponding connection by means of a computer mouse. The user may then move selection bar 508 to another entity of list 502 or 504 for visualisation of previously entered combinations and/or for entering or editing of combinations. These combinations are stored in the corresponding combination database table (cf. combination database table 120 of FIG. 1).

It is important to note that more than two lists may be shown in dialogue box 500 on both sides of connector field. Selection bar 508 may be used to select any one of the entities of the lists for display of the connectors originating for the selected entity.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system, comprising:
   a plurality of application programs, each application program requiring an input database table having a predefined set of attributes, each predefined set of attributes defining a class of database tables;
   a relational database for storing a set of database tables, the set of database tables comprising at least one combination database table, each database table having at least one of the predefined sets of attributes;
   a user interface for entering the at least one combination database table by entering a combination of at least first and second database tables of the set of database tables and for selecting at least first entries from the first database table and second entries from the second database table, and for entering a selection of one of the application programs, wherein the user interface comprises means for displaying a matrix having a column direction for displaying the first entries of the first database table and having a row direction for displaying the second entries of the second database table and means for displaying of check-boxes for the matrix elements for entering of combinations of the entries of the first and second database tables;
   a first mapping table for storing assignments of sub-sets of the set of database tables to the classes; and
   a processor for execution of the selected one of the application programs by reading the database tables of the set of database tables that are assigned to the class required by the selected application program.

2. The data processing system of claim 1, wherein the attributes of the predefined sets of attributes have attribute names in compliance with a naming convention being applicable to the application programs and the set of database tables.

3. The data processing system of claim 1, wherein the relational database is stored in a data warehouse.

4. The data processing system of claim 1, wherein the user interface comprises means for displaying a first list of the first entries of the first database table and a second list of the second entries of the second database table and means for entering a graphical connector between selected first and second entries displayed in the first and second lists in order to determine the combination of the entries.

5. The data processing system of claim 1, wherein each application program is adapted to store a result of a data processing operation performed on the input database table in an on-line analytical processing cube of a predefined class of on-line analytical processing cubes using an on-line analytical processing component, and further comprising:
   a second mapping table for mapping the on-line analytical processing cubes to the predefined classes of on-line analytical processing cubes; and
   wherein the processing means is adapted to store the result of the processing in one of the on-line analytical processing cubes of the set of on-line analytical processing cubes required by the selected one of the application programs.

6. The data processing system of claim 5, wherein the interface means is adapted for entering the first and second mapping tables.

7. The data processing system of claim 1, further comprising an interface for extracting, transforming and loading data from internal or external data sources into the relational database.

8. A data processing method, comprising the steps of:
   providing a plurality of application programs, each application program requiring an input database table having a predefined set of attributes, each predefined set of attributes defining a class of database tables;
   providing a relational database for storing a set of database tables, the set of database tables comprising at least one combination database table, each database table having at least one of the predefined sets of attributes;
   displaying a matrix having a column direction for displaying first entries of a first database table and having a row direction for displaying second entries of a second database table and displaying of check-boxes for the matrix elements for entering of combinations of the entries of the first and second database tables;
   entering using the displayed matrix the at least one combination database table by entering a combination of at least first and second database tables of the set of database tables and selecting at least first entries from the first database table and second entries from the second database table storing assignments of sub-sets of the set of database tables to the predefined classes in a first mapping table;

selecting one of the application programs; and executing the selected one of the application programs by reading the database tables of the set of database tables that are assigned to the class required by the selected application program.

9. The data processing method of claim 8, wherein the attributes of the predefined sets of attributes have attribute names in compliance with a naming convention being applicable to the application programs and the set of database tables.

10. The method of claim 8, further comprising displaying a first list of the first entries of the first database table and a second list of the second entries of the second database table and entering a graphical connector between selected first and second entries displayed in the first and second lists in order to determine the combination of the entries.

11. The method of claim 8, further comprising:

providing an on-line analytical processing component;

providing a set of on-line analytical processing cubes;

assigning one of the on-line analytical cubes to a class of on-line analytical processing cubes supported by one of the application programs; and storing the assignment in a second mapping table.

12. The method of claim 11, further comprising storing a result of a data processing performed by a one of the application programs in the on-line analytical processing cube assigned to that application program.

13. A computer-readable storage medium including instructions executed by a processor for performing a method for providing data processing, the method comprising:

providing a plurality of application programs, each application program requiring an input database table having a predefined set of attributes, each predefined set of attributes defining a class of database tables;

providing a relational database for storing a set of database tables, the set of database tables comprising at least one combination database table, each database table having at least one of the predefined sets of attributes;

displaying a matrix having a column direction for displaying first entries of a first database table and having a row direction for displaying second entries of a second database table and displaying of check-boxes for the matrix elements for entering of combinations of the entries of the first and second database tables;

entering using the displayed matrix the at least one combination database table by entering a combination of at least first and second database tables of the set of database tables and selecting at least first entries from the first database table and second entries from the second database table storing assignments of sub-sets of the set of database tables to the predefined classes in a first mapping table;

selecting one of the application programs; and executing the selected one of the application programs by reading the database tables of the set of database tables that are assigned to the class required by the selected application program.

14. The computer-readable medium of claim 13, wherein the attributes of the predefined sets of attributes have attribute names in compliance with a naming convention being applicable to the application programs and the set of database tables.

15. The computer-readable medium of claim 13, wherein the method further comprises:

displaying a first list of the first entries of the first database table and a second list of the second entries of the second database table and entering a graphical connector between selected first and second entries displayed in the first and second lists in order to determine the combination of the entries.

16. The computer-readable medium of claim 13, wherein the method further comprises:

providing an on-line analytical processing component;

providing a set of on-line analytical processing cubes;

assigning one of the on-line analytical cubes to a class of on-line analytical processing cubes supported by one of the application programs; and storing the assignment in a second mapping table.

17. The computer-readable medium of claim 16, wherein the method further comprises:

storing a result of a data processing performed by one of the application programs in the on-line analytical processing cube assigned to that application program.

* * * * *